March 25, 1941.　　　J. H. BOICEY　　　2,235,958
PROCESS FOR PRESSING LAMINATED GLASS
Filed Feb. 26, 1937　　　4 Sheets-Sheet 1

Inventor
JAMES H. BOICEY.
Frank Fraser
Attorney

March 25, 1941. J. H. BOICEY 2,235,958
PROCESS FOR PRESSING LAMINATED GLASS
Filed Feb. 26, 1937 4 Sheets-Sheet 2
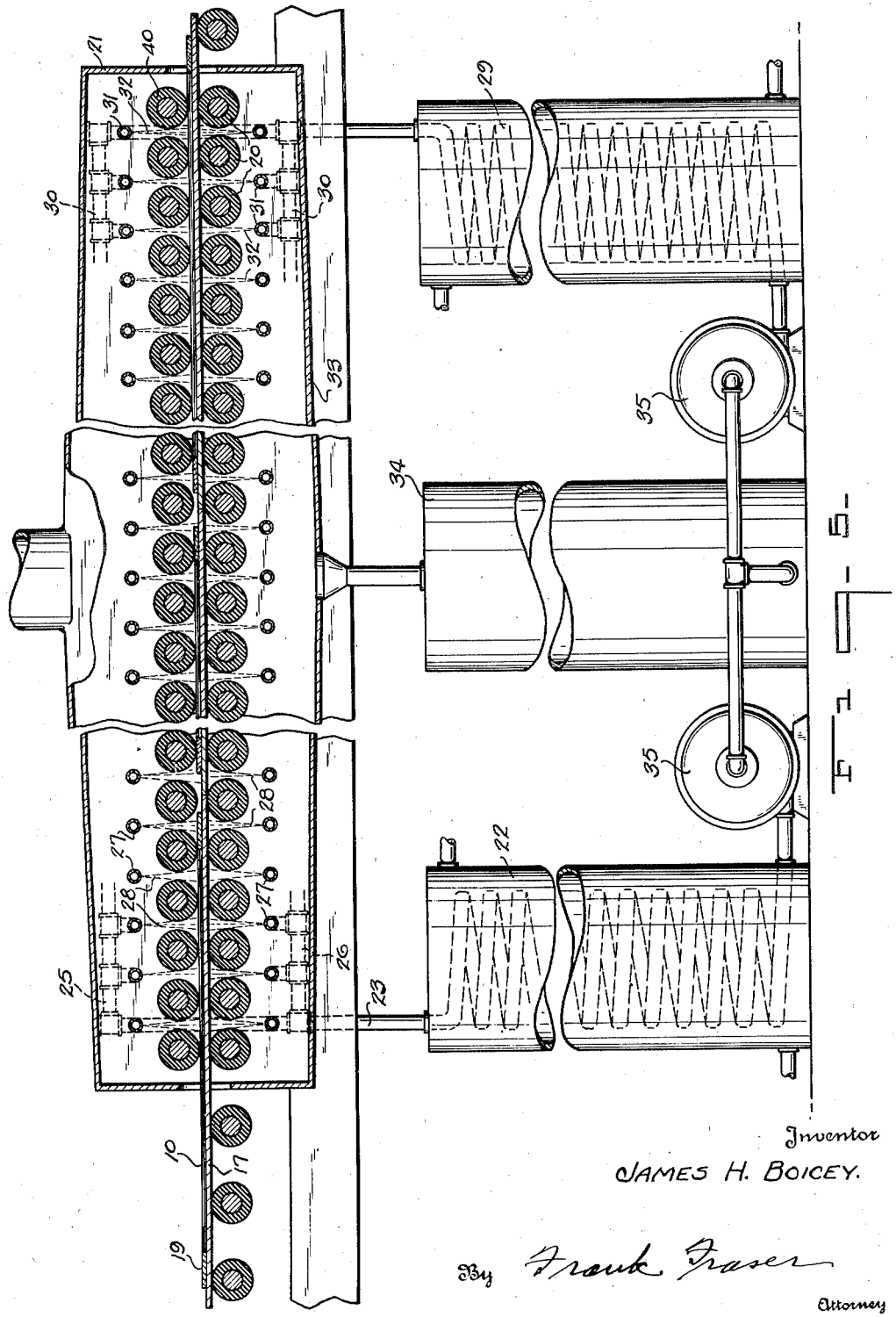
Inventor
JAMES H. BOICEY.
By Frank Fraser
Attorney

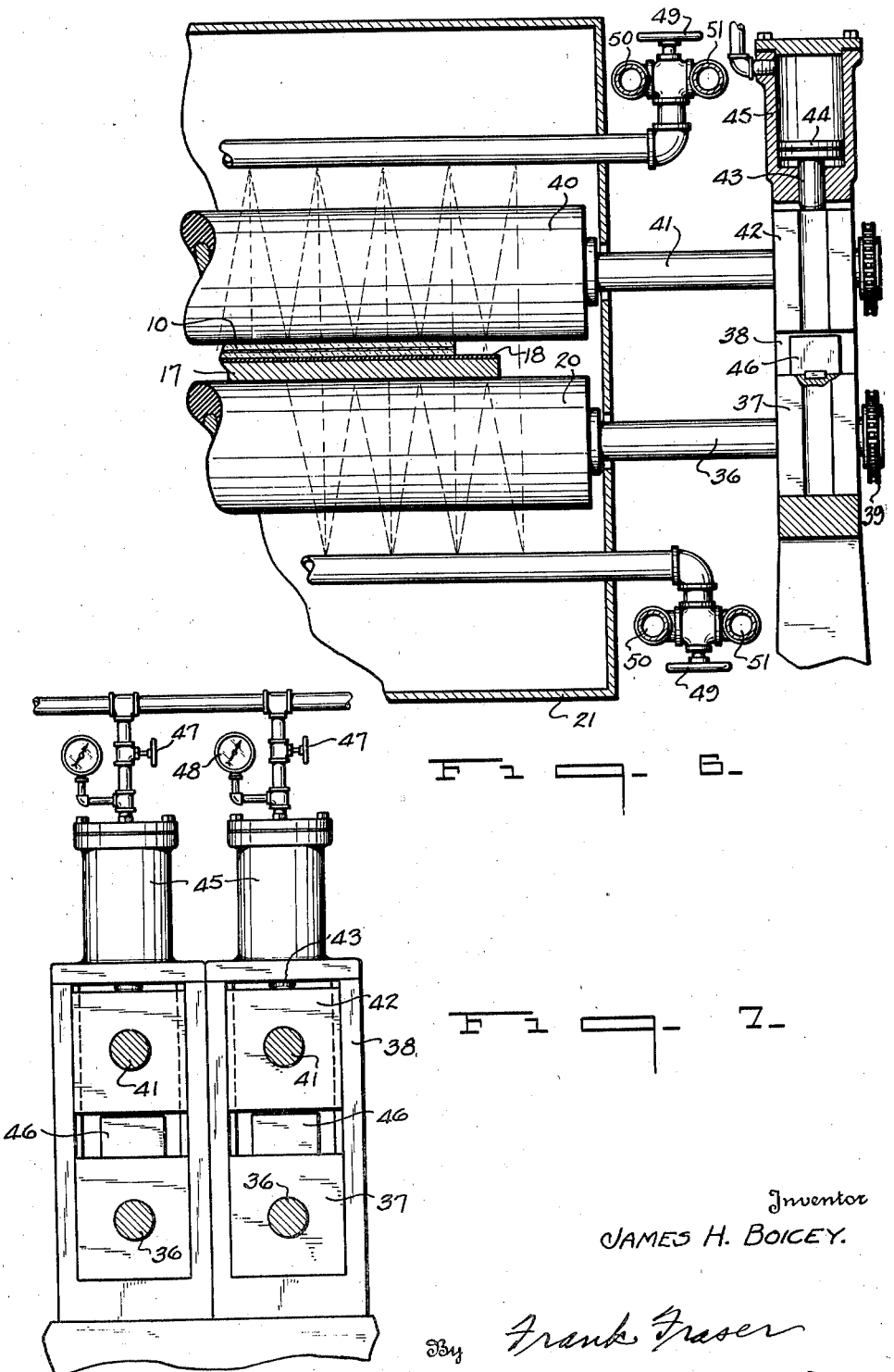

March 25, 1941.  J. H. BOICEY  2,235,958

PROCESS FOR PRESSING LAMINATED GLASS

Filed Feb. 26, 1937   4 Sheets-Sheet 4

Inventor
JAMES H. BOICEY.

By Frank Fraser
Attorney

Patented Mar. 25, 1941

2,235,958

UNITED STATES PATENT OFFICE 2,235,958

PROCESS FOR PRESSING LAMINATED GLASS

James H. Boicey, Toledo, Ohio, assignor to Libbey-Owens-Ford Glass Company, Toledo, Ohio, a corporation of Ohio Application February 26, 1937, Serial No. 127,889

7 Claims. (Cl. 49—81)

The present invention relates to a process for use in the production of laminated safety glass and more particularly to the pressing and bonding of the laminations together.

In accordance with the present invention, glass and plastic layers, after having been suitably treated and properly associated with one another, can be permanently bonded together by arranging the safety glass assembly on a substantially rigid support and then applying rolling pressure to the exposed lamination.

I am aware of the fact that squeegee rolls and nipping rolls have been used heretofore in the laminated safety glass art but to my knowledge roll pressure has not been heretofore successfully used in effecting final compositing of glass and plastic laminations. The distinction is that roll pressing devices used prior to my invention have been for accomplishing preliminary or initial bonding of the laminations, and to obtain final compositing of the laminations the rolled or squeegeed glass has been subjected to to an additional or second pressing step such as by means of an autoclave.

By following the present invention, however, it is possible to finally composite the glass and plastic laminations by means of a roll press machine. One of the main difficulties with prior attempts to produce laminated safety glass with this type of machine has been excessive pinching of the leading and following edges of the sandwich being pressed. It will be apparent that in view of the substantial pressure treatment required to satisfactorily press the glass and plastic laminations, the problem of pinching the front and back edges of the sandwiches is a serious one and has resulted in excessive glass breakage or at least very unsatisfactory edge conditions because of thinning of the plastic and distortion of the glass. Even though the glass sheets are not actually broken during pressing by reason of the pinching referred to, the danger of "after-cracks" appearing in the glass or pulling of the glass away from the plastic leaving unbonded areas has had a discouraging influence on attempts to use roll press machines.

In addition to the edge pinching, plastic thinning, etc., it has been found that roll pressing is difficult because of variations in thickness of glass that exist as well as variations in gauge uniformity of the plastic itself. To mold the plastic between the glass requires substantial pressure and ordinarily heat is employed to effect requisite molding and bonding of the plastic between the glass sheets.

In accordance with my invention, edge pinching of the leading and following edges is completely avoided and by arranging the safety glass sandwiches on suitable supports and moving the support and glass between a series of pairs of rolls, necessary pressure can be exerted upon the exposed glass surface to bring about the proper union between the laminations. By providing spacer strips, edge pinching is guarded against and, as will appear hereinafter, safety glass may be produced in a continuous manner without breakage.

Other objects and advantages of the invention will become more apparent during the course of the following description when taken in connection with the accompanying drawings.

In the drawings wherein like numerals are employed to designate like parts throughout the same.

Fig. 5 is a diagrammatic view of the complete machine showing passage of a number of sandwiches through the machine and means provided for controlling the temperature of the glass during pressing;

Fig. 6 is a fragmentary vertical transverse view showing the glass between a pair of rolls and application of fluid to control temperature of the sandwich;

Fig. 7 is an enlarged detailed view showing the roll supporting and pressure controlling mechanism;

Figure 2:
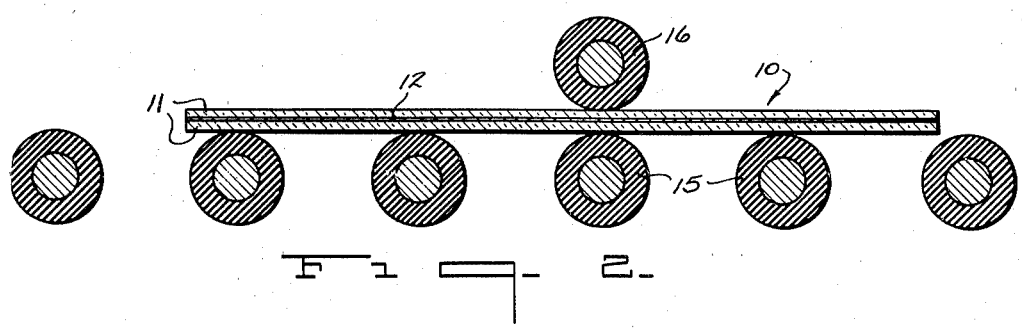
Fig. 2 is a similar view showing a layer of plastic between two sheets of glass forming a sandwich which is being subjected to a relatively light nipping action to prepare the sandwich for final compositing in my roller press machine.

In Fig. 2 a safety glass sandwich 10 is shown as being composed of two sheets of glass 11 and an inner layer of thermoplastic material 12. The present invention of course is not restricted to any particular plastic, method of forming the plastic, or application thereof between the glass sheets, or adhesive means that may be employed to get the desired bond between the laminations.

Numerous plastics can be used, and I have found that the present roller press machine is particularly well adapted for safety glass in which the thermoplastic layer 12 is a polyvinyl acetal resin plastic. However, the machine can be used for other thermoplastic materials capable of use in safety glass as will be understood.

Figure 1:
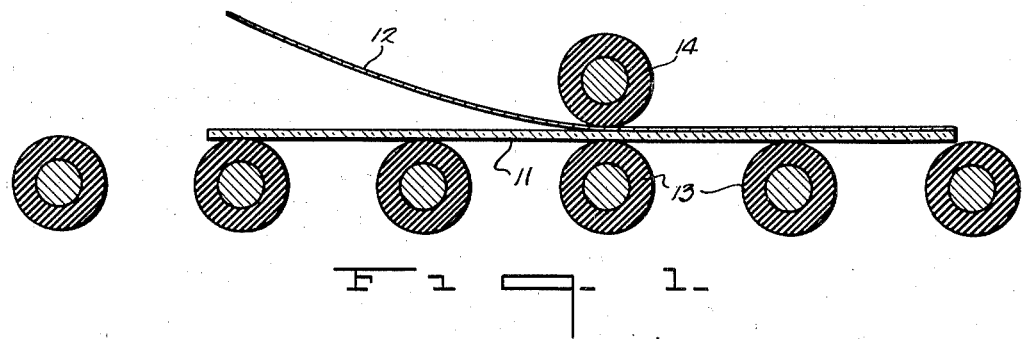
Fig. 1 is a diagrammatic view illustrating one method which may be used to lay a layer of plastic upon a sheet of glass.

As shown in Fig. 1, the plastic layer 12 is applied as a single sheet to the glass 11. Some forms of thermoplastic exhibit self-bonding properties to glass while other plastics require the use of adhesives or similar bond-inducing mediums for proper adherence to the glass. Therefore, if adhesives are required, they may be applied to the glass before the plastic is associated therewith. Some of the synthetic resins are quite flexible or limp in nature and to insure proper positioning of the plastic upon or between the glass sheets, the plastic may be rolled in place as illustrated in Fig. 1, where the glass sheet is supported on the roller conveyor 13 and fed under the roller 14 so positioned as to smooth the plastic sheet out upon the glass 11. The rolls of the conveyor 13 and the roll 14 may be any suitable material such as a rubber covered metal roll or the like. My invention is not restricted to this method of associating the plastic layer with the glass as it is directed to final compositing of the laminations after they have been suitably positioned with respect to one another.

In Fig. 2 is illustrated diagrammatically a squeegee machine designed to give a preliminary nip to the sandwich 10 to permit handling of the sandwich and pressing thereof in the roller press machine without relative movement between the laminations. As shown, the preliminary nip machine may consist of the conveyor rolls 15 and a roll 16 placed in opposition to one of the conveyor rolls. By suitable adjustment of the rolls, the desired preliminary pressing of the sandwich 10 may be accomplished. It is not advisable to apply excessive pressure to the sandwich during the preliminary nipping, and in any event the pressure exerted is insufficient to effect final compositing of the laminations. Thus, after the laminations of the sandwich have been pressed by the machine in Fig. 2, they are not sufficiently well bonded together to permit normal use of the sandwich as laminated safety glass for it requires additional pressing treatment to bring about final compositing of the laminations.

An obvious way, of course, to produce this final compositing would seem to be passing the sandwich through a series of rolls such as shown in Fig. 2, exerting adequate pressure to bring about the final compositing. However, experience to date has shown that this cannot satisfactorily be done.

Figure 3:
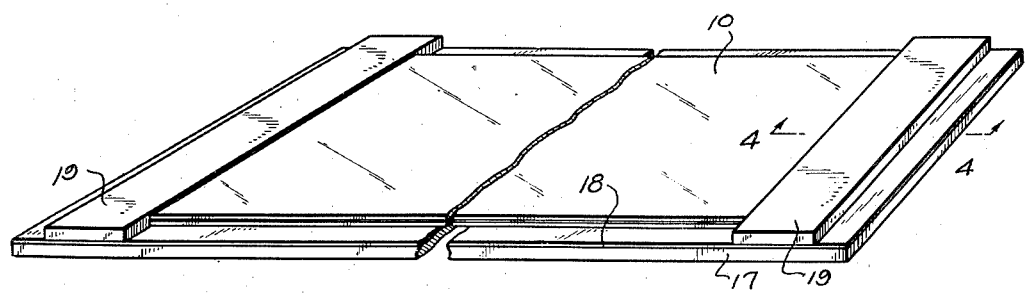
Fig. 3 is a perspective view showing the sandwich placed upon a support with spacer strips arranged at each end of the sandwich to prevent edge pinching when the glass is being finally composited.
Figure 4:
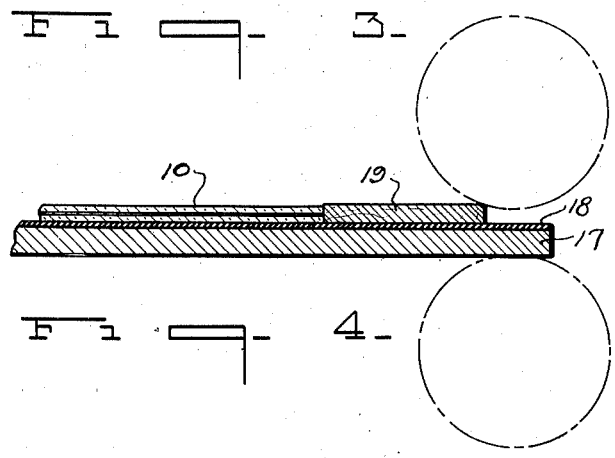
Fig. 4 is a fragmentary longitudinal vertical section through the support, safety glass sandwich, and spacer strip, illustrating how the pressing rolls contact with the spacer strip before exerting pressure upon the sandwich.

In accordance with the present invention, the preliminary pressed sandwich 10, as shown in Fig. 3, is placed upon a substantially rigid support 17 which may be a metal plate provided with a mattress or cushion 18. The thickness of the plate 17 will be dependent upon the selection of metal. Aluminum, steel, or other plates will work satisfactorily. The mattress 18 may be a sheet of paper, rubber or the like, placed upon the metal plate, or a rubber cushion or other material may be permanently affixed to the surface of the metal. I consider it preferable to interpose some form of cushioning means between the rigid support 17 and the sandwich 10. Spacer strips 19 are also placed upon the cushion as shown in Figs. 3 and 4, and the spacer or guard strips 19 are substantially the same thickness as that of the sandwich 10, being preferably slightly thicker, and one or two thousandths excess thickness has been found to be entirely satisfactory. The guard strips 19 may be of wood, linoleum or other materials.

As shown in Fig. 4, a single safety glass sandwich is resting upon the support 17. In the simplest form of the machine, the plates 17 will be of a size and weight capable of being handled by one or two men and of course the number of sandwiches that may be placed on one metal support will be dependent upon the shape and size of the sandwiches. In a more elaborate construction, means can be provided for mechanically handling the plates 17, thus permitting larger plates to be used than those illustrated herein.

As shown in Fig. 5, the supports and laminated safety glass sandwiches properly mounted thereon, and having associated therewith the spacer or guard strips 19, are adapted to be passed through a series of pairs of rolls. In the simplest form the rolls are disposed in vertical alignment, with the lower roll in each pair serving as a horizontal conveyor 20. The conveyor rolls 20 may be rubber covered metal rolls or can be of other construction. Of course, these rolls should be substantial enough to withstand the weight and pressures to which they are exerted in normal use without becoming unduly distorted or otherwise rendered unfit for satisfactory service.

The rolls are preferably arranged in a tunnel 21, and in Fig. 5 the left hand side is the intake end of the machine. Ordinarily it is preferred that the laminations be heated during the pressing operation, although with some types of plastics and processes, heating may not be required. In the event heating is desired, the intake end of the tunnel 21 is provided with heating elements. Electrical means or other heating devices can be employed for controlling the temperature. I have found the use of liquid sprays suitable for this purpose and to this end the heat exchanger 22 is designed to supply heated fluid through the conduit 23 to the upper and lower manifolds 25 and 26 carrying the discharge pipes 27 through which sprays of heated liquid 28 are directed. The upper sprays are directed upon the upper exposed surface of the sandwich, while the lower sprays are discharged upon the bottom of the glass supporting plate.

Near the exit end of the tunnel, the glass and support may be cooled to bring it to room temperature, and to accomplish this the cooling device 29 is adapted to feed cooling material to the manifolds 30, supplying the spray pipes 31 directing cooling sprays 32 upon the safety glass and its support. The bottom of the tunnel 21 may be sloped as at 33 to return the used fluid to the tank 34 from which it may be circulated by means of the pumps 35 to either the heat exchanger tank 22 or the cooling tank 29. It will of course be understood that the means shown for supplying heated and cooled fluids to the glass is by way of illustration only.

Referring to Figs. 6 and 7, it will be noticed that the lower rolls 20 are carried on the shafts 36 supported by the journals 37 mounted in the brackets 38. A drive socket 39 is provided on the end of each of the shafts 36, with any proper driving mechanism being employed to produce rotation of the rolls.

The upper rolls 40 are carried on the shafts 41 also mounted in journals 42 slidably mounted in the brackets or standards 38. Each of the journals 42 is connected to a shaft 43 carrying a piston 44 operating in the cylinder 45. Disposed between the journals 37 and 42 are spacer blocks 46 which restrict movement of the upper roll toward the lower roll. As shown in Fig. 7, valves 47 permit accurate and independent control of each roll, with gauges 48 being used to indicate to the operator the pressure of each roll. While fluid pressure is preferred as a means of controlling the roll pressure, any suitable construction can be substituted for that illustrated. Of course the spacer blocks 46 are readily removable so that proper blocks may be used with the different thicknesses of safety glass being pressed. It will also be noted in Fig. 6 that mixing valves 49 are mounted in the system so that fluid from the hot pipes 50 and cold pipes 51 can be utilized as desired to give proper temperature control during movement of the glass through the press machine.

Figure 8:
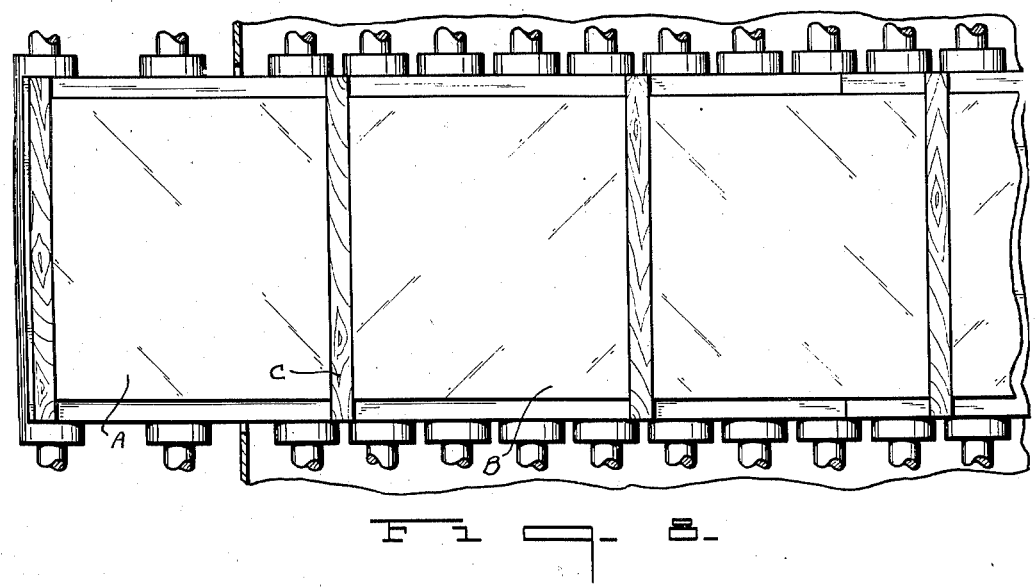
Fig. 8 is a fragmentary plan view showing a number of safety glass sandwiches in position for pressing.
Figure 9:
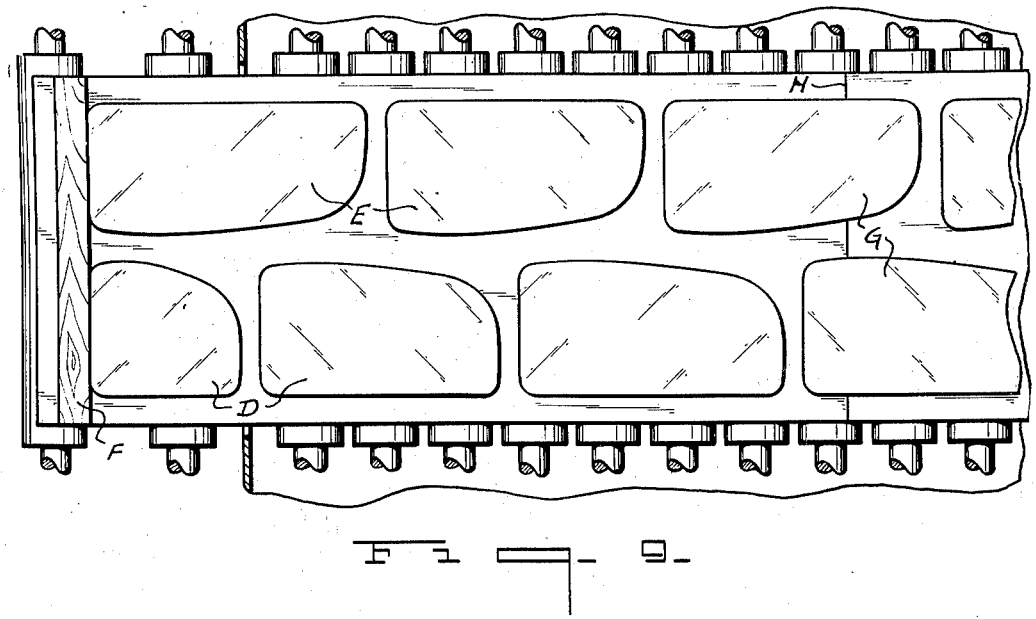
Fig. 9 is a similar view showing a modified arrangement of safety glass sandwiches ready for pressing.

In Figs. 8 and 9, two different arrangements of safety glass sandwiches are shown. In Fig. 8 large sheets of laminated safety glass are being pressed, with sandwich A of Fig. 8 being spaced from sandwich B by the spacer C. In this particular arrangement, spacer or guard strips are mounted between adjacent sheets of glass.

In Fig. 9 a modified arrangement is shown wherein the sandwiches D are staggered with relation to the sandwiches E so that spacer strips are not required between adjacent safety glass sandwiches. In this particular arrangement, the spacer strips need be used only at the commencement of the operation and at the close, attention being directed to spacer strip F to the left of Fig. 9.

It will also be noted that in Fig. 9 the safety glass sandwiches G are shown as overlapping the joint H between adjacent glass supports, whereas in Fig. 5 it will be noted that none of the safety glass sandwiches overlie joints between adjacent supports.

It is preferred that the safety glass sandwich not overlie the joints of adjacent plates, but if sufficiently rigid supports are employed and the machine is accurately lined up, it may be possible to permit overlap of the sandwiches as illustrated in Fig. 9 without ill effects.

In operation, after the sandwiches 10 have been preliminarily nipped as already explained, they are placed upon a support preferably provided with a mattress. Spacer or guard strips are then mounted on the support in a manner such as illustrated in Fig. 3, and as the support and its contents are fed through the machine, the rolls which have been adjusted to give the necessary pressure bear first upon the spacer strip. It will be appreciated that the adjustment of the rolls is such that they must be forced apart when the spacer strip is first fed between them, and this is illustrated clearly in Fig. 4. It is this forcing apart of the rolls that results in edge pinching of the glass if guard strips are not employed. When the guard strips are used, they take care of separating the rolls so that as the glass is fed between the rolls after the guard strips, there is no excessive edge pinching. In the same way, the guard strip at the following edge of the sandwich prevents pinching of the glass by the rolls as they tend to return to their starting position.

In Fig. 9 the guard strips are not used between adjacent sandwiches in view of the fact that at no time are the rolls permitted to come together because by staggering of the sandwiches, the rolls are held in proper position to prevent edge pinching. However, as a preliminary precaution, strips can be placed between adjacent sandwiches even with the staggered arrangement of Fig. 9.

As one example of a pressing cycle that has given satisfactory results, the machine has been operated at a speed of approximately two feet per minute, employing a twenty-four minute cycle, with sixteen minutes being devoted to pressing, while the glass is subjected to heated fluid and the final eight minutes being devoted to cooling of the glass.

As will be seen in Fig. 5, the supporting plates and their contents are fed into the machine so that succeeding plates abut plates previously fed to the machine, presenting a continuous support for the safety glass sandwiches.

I have found that the results obtained by placing the sandwiches on the rigid supports are vastly superior to the results obtained when the sandwiches are merely fed between a series of pairs of rolls. Preferably, the rigid support acts in the capacity of a master surface and the cushion between the support and glass permits necessary pressure application without breaking or crushing of the glass.

By reason of the pressure control of the upper rolls, they will follow the contour of the upper surface of the sandwich pressed, and as the support and sandwich are advanced through the machine, the rolls will apply the necessary pressure and in such a manner as to effect final and complete molding and bonding of the plastic between the glass. In the preferred embodiment, the peripheral speed of the upper set of pressing rollers is synchronized with the peripheral speed of the lower set of rolls so that there is no skidding of the pressing rollers upon the glass sheets.

It has been found that by employing a liquid spray using, for example, such liquids as diethylene glycol, the temperature of the sandwiches can be accurately controlled without in any way spoiling the safety glass.

Conveyors are provided at both ends of the roller press machine to permit loading and unloading thereof. As the supports and pressed glass leave the press machine, the glass may be removed and the supports and strips returned to the loading end for pressing of other sandwiches. This gives a truly continuous type of pressing machine capable of producing commercial results. After passing through the machine just described, the safety glass does not have to be given any further pressure treatment to bond the laminations together.

If the type of plastic used is such that edge sealing is required, this operation is of course performed as is well understood in the art. With some types of plastics, edge sealing is not required and the safety glass may be edged and made ready for use in the customary manner as the pressing treatment does not in any way require additional operations not heretofore used in the edging and preparation of safety glass for consumption.

Obviously, the principle embodied in the machine illustrated can be carried further in that special cranes or other devices can be used for handling the metal plates or the metal plates can be arranged as sections of an endless type conveyor, with the return of the conveyor being under the machine illustrated in Fig. 5. The present invention contemplates any adoption of the principle of pressing safety glass wherein the glass sandwich is backed up with a rigid support while rolling devices or equivalent members exert pressure upon the exposed surface of the sandwich and with guard members being used to prevent edge pinching of the lamination.

I claim:

1. The process of producing safety glass comprising two sheets of glass and an interposed adherent thermoplastic layer, including the steps of arranging the laminations in proper superimposed relationship, then placing the sandwich thus formed on a substantially rigid support, then associating a guard member with each end of said sandwich, and then passing said support, sandwich and guard members through a series of pairs of rolling devices to effect final compositing of the said laminations, said guard members preventing excessive edge pinching of the sandwich.

2. The process of producing safety glass comprising two sheets of glass and an interposed adherent thermoplastic layer, including the steps of arranging the laminations in proper superimposed relationship, then placing the sandwich thus formed on a substantially rigid support, then associating a guard member with each end of said sandwich, and then passing said support, sandwich and guard members through a series of pairs of rolling devices to effect final compositing of the said laminations, while simultaneously elevating the temperature of said sandwich, said guard members preventing excessive edge pinching of the sandwich.

3. The process of producing safety glass comprising two sheets of glass and an interposed adherent thermoplastic layer, including the steps of arranging the laminations in proper superimposed relationship, then placing the sandwich thus formed on a substantially rigid support, then associating a guard member with each end of said sandwich, and then passing said support, sandwich and guard members through a series of pairs of rolling devices to effect final compositing of the said laminations, while simultaneously directing sprays of temperature controlling liquid upon said sandwich.

4. The process of producing safety glass comprising two sheets of glass and an interposed adherent thermoplastic layer, including the steps of arranging the laminations in proper superimposed relationship, then associating the sandwich thus formed with a substantially rigid backing and then applying rolling pressure to the exposed face of the sandwich to effect final compositing of the said laminations, placing the sandwich thus formed on a substantially rigid support and passing said support and sandwich through a series of pairs of pressing devices and momentarily separating each pair of pressing devices just prior to entrance of the sandwich therebetween, to finally composite the laminations without pinching the edges thereof.

5. The process of producing safety glass comprising two sheets of glass and an interposed adherent thermoplastic layer, including the steps of preparing a plurality of sandwiches by arranging the laminations of each in proper superimposed relationship, arranging alternate sandwiches and guard members upon a substantially rigid support with the guard members being disposed between the ends of adjacent sandwiches and then passing said support and its contents through a series of pairs of pressing devices to effect final compositing of the sandwiches without excessive pinching of its edges.

6. The process of producing safety glass comprising two sheets of glass and an interposed adherent thermoplastic layer, including the steps of preparing a plurality of sandwiches by arranging the laminations of each in proper superimposed relationship, arranging alternate sandwiches and guard members upon a substantially rigid support with the guard members being disposed between the ends of adjacent sandwiches and then passing said support and its contents through a series of pairs of pressing devices to effect final compositing of the sandwiches without excessive pinching of its edges, while elevating the temperature of said sandwiches.

7. The process of producing safety glass comprising two sheets of glass and an interposed adherent thermoplastic layer, including the steps of arranging the laminations in proper superimposed relationship to form a sandwich, then placing the sandwich on a substantially rigid support and associating guard members with the ends thereof, then passing the same through a series of pairs of pressing devices to effect final compositing of the sandwich, the application of pressure being so controlled that relatively less pressure is applied to the ends of the sandwich than to the remaining portions thereof.

JAMES H. BOICEY.